United States Patent
Srivastava et al.

(10) Patent No.: US 11,226,922 B2
(45) Date of Patent: Jan. 18, 2022

(54) SYSTEM, APPARATUS AND METHOD FOR CONTROLLING DUTY CYCLE OF A CLOCK SIGNAL FOR A MULTI-DROP INTERCONNECT

(71) Applicant: Intel Corporation, Santa Clara, CA (US)

(72) Inventors: Amit K. Srivastava, Folsom, CA (US); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 15/841,482

(22) Filed: Dec. 14, 2017

(65) Prior Publication Data

US 2019/0042526 A1  Feb. 7, 2019

(51) Int. Cl.
*G06F 13/42* (2006.01)
*G06F 13/364* (2006.01)

(52) U.S. Cl.
CPC ........ *G06F 13/4291* (2013.01); *G06F 13/364* (2013.01); *G06F 2213/0016* (2013.01)

(58) Field of Classification Search
CPC ............... G06F 13/364; G06F 13/4282; G06F 13/4291; G06F 2213/0016; G06F 1/04; G06F 1/08; G06F 1/10; H03K 3/017
USPC .......................................................... 710/110
See application file for complete search history.

(56) References Cited

U.S. PATENT DOCUMENTS

| | | | |
|---|---|---|---|
| 7,471,599 B2 * | 12/2008 | Hsu | G11B 7/00456 369/47.28 |
| 9,742,603 B1 * | 8/2017 | Bandi | H04L 7/10 |
| 10,164,618 B1 * | 12/2018 | Shi | H03K 5/082 |
| 10,185,697 B2 * | 1/2019 | Yang | G06F 13/1673 |
| 10,241,536 B2 * | 3/2019 | Quiet | G06F 1/08 |
| 10,241,537 B2 * | 3/2019 | Li | H03K 5/04 |
| 10,417,149 B2 * | 9/2019 | Singh | G06F 1/3287 |
| 10,489,337 B2 * | 11/2019 | Quiet | G06F 13/4022 |
| 10,784,847 B1 * | 9/2020 | Tandon | H03K 5/1565 |
| 2007/0001737 A1 * | 1/2007 | Sundararaman | G06F 1/04 327/291 |
| 2010/0169523 A1 | 7/2010 | Dunstan et al. | |
| 2013/0335151 A1 | 12/2013 | Schrom et al. | |
| 2014/0016679 A1 | 1/2014 | Kesling et al. | |
| 2018/0052791 A1 * | 2/2018 | Srivastava | G06F 13/364 |
| 2018/0293196 A1 * | 10/2018 | Srivastava | G06F 13/4291 |

OTHER PUBLICATIONS

U.S. Appl. No. 15/237,928, filed Aug. 16, 2016, entitled "Method, Apparatus and System for Role Transfer Functionality for a Bus Master," by Amit Kumar Srivastava, et al.

(Continued)

*Primary Examiner* — Brian T Misiura
(74) *Attorney, Agent, or Firm* — Trop, Pruner & Hu, P.C.

(57) ABSTRACT

In an embodiment, a host controller is to couple to an interconnect to which a plurality of devices may be coupled. The host controller may include: a first driver to drive first information onto the interconnect according to a bus clock signal; a first receiver to receive second information from at least one of the plurality of devices via the interconnect according to the bus clock signal; and a clock generation circuit to generate the bus clock signal having an asymmetric duty cycle. Other embodiments are described and claimed.

20 Claims, 8 Drawing Sheets

10

(56) References Cited

OTHER PUBLICATIONS

U.S. Appl. No. 15/366,001, filed Dec. 1, 2016, entitled "Method, Apparatus and System for Dynamic Clock Frequency Control on a Bus," by Duane G. Quiet, et al.
U.S. Appl. No. 15/198,027, filed Jun. 30, 2016, entitled "Method, Apparatus and System for Dynamic Optimization of Signal Integrity on a Bus," by Duane G. Quiet.
U.S. Appl. No. 15/483,079, filed Apr. 10, 2017, entitled "System, Apparatus and Method for Link Training for a Multi Drop Interconnect," by Amit K. Srivastava, et al.

* cited by examiner

SYSTEM, APPARATUS AND METHOD FOR CONTROLLING DUTY CYCLE OF A CLOCK SIGNAL FOR A MULTI-DROP INTERCONNECT

TECHNICAL FIELD

Embodiments relate to communication via multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, expected to become available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller.

DETAILED DESCRIPTION

In various embodiments, read and write operations (or at least one of read and write operations) may be performed along a multi-drop bus using a bus clock signal that has an asymmetric duty cycle. That is, as data changes for read and/or write operations may proceed during a low portion period of the periodic bus clock signal, the bus clock signal may be controlled to have a longer low portion period than high portion period. Such asymmetric duty cycle enables relaxed timing constraints for slave devices to communicate read data, as well as providing relaxed timing constraints within a host controller.

As will be described further herein, in example embodiments multiple devices may be coupled to a multi-drop bus, including at least one master device and one or more slave devices. During read operations by the master device (namely when a slave device is communicating data/command information to the master), the master device may be providing the bus clock signal to the slave device. As such, tight timing constraints may exist. This is particularly so, as in certain communication modes, the slave device is permitted to change data during a low portion of the bus clock signal, to enable the master device to sample the data reliably on a positive edge of the bus clock signal. As such, this communication mode, referred to herein as a single data rate (SDR) mode, is implemented with half cycle path timing which may incur approximately 40 nanoseconds (ns) where bus operations occur at a rate of 12.5 MegaHertz (MHz).

In embodiments, bus speed may be optimized by providing this asymmetric duty cycle in which a low portion period of the bus clock signal is increased and the high portion period is decreased, while maintaining a given operating frequency of the bus clock signal. In this way, larger timing budget may be realized for read/write operations. As a result, system manufacturers such as original vendor manufacturers (OVMs) may have greater flexibility, e.g., allowing use of longer board trace lengths.

As such, embodiments enable long reach solutions using this asymmetric clocking technique for read and (potentially) write operations. As a result, devices are provided with more system timing margin for read and write operations while maintaining a given bus operating frequency. As such, bus implementations as described herein may be implemented in client and server segments having longer board trace topologies. In this way, bus performance may be improved at a given bus speed (e.g., 12.5 megabits per second (Mbps)) without compromising bus operating speed, while at the same time providing flexibility by way of the configurability of controllable duty cycles as described herein.

Figure 1:
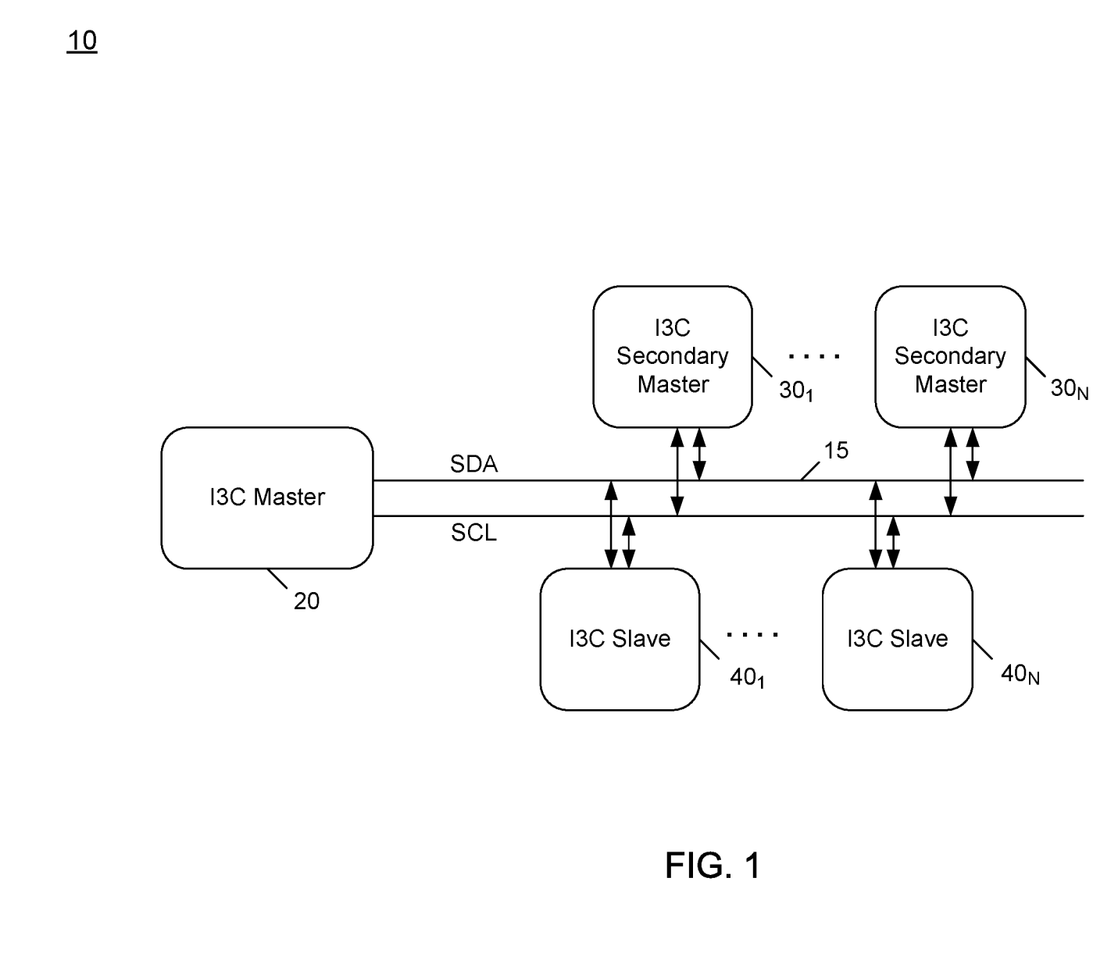
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with the forthcoming I3C specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware logic to act as a bus master for bus 15. Master device 20 may include a controller (not shown in the high level view of FIG. 1) to control data (SDA) and clock (SCL), as well as use (e.g.) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware logic, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bidirectional manner and clock communication can occur in a single direction. Master device 20 may be a relatively compute complex device (as compared to other devices on bus 15) that consumes higher power than other devices coupled to bus 15.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20 known as a secondary master). As will be described herein one or more such secondary master devices 30 may be controlled to act as bus master for bus 15 while main master device 20 is in a low power state, to enable bus operations to continue to proceed while in this low power state.

As further illustrated in FIG. 1, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices or so forth. Understand while shown at this high level in the embodiment of FIG. 1, many variations and alternatives are possible.

During read/write operations on bus 15, the timing window available to complete read/write is nearly 50% of bus the period. For write mode, this available bus window is as follows: $t_{busavail} = t_{master} + t_{skew} + t_{setup} <= 40$ ns. For read mode, the available bus window is: $t_{busavail} = t_{master}\ t_{m-s-m} + t_{slave} + t_{setup} <= 40$ ns, where $t_{master}$ is the master propagation delay (e.g., 5-6 ns), $t_{slave}$ is the slave response time (e.g., 12 ns-20 ns), $t_{m-s-m}$ is the return path signal from master-slave-master, $t_{setup}$ is the setup time (e.g., 3 ns), and $t_{skew}$ is total system skew. Note that $t_{m-s-m}$ and $t_{skew}$ may be considered in determining bus operating frequency, especially when $t_{skew}$ signal timing loss is more due to reflections and larger rise time (non-monotonic rise/fall time) of signals, which may limit the platform bus topologies to shorter traces and matched routing. Embodiments may relax these timing constraints.

With the arrangement of FIG. 1, a slave device (e.g., slave device 40 or secondary master device 30) may change data to be communicated when the bus clock signal is low. As master device 20 drives this clock signal, which may be generated from a system clock signal that is at a frequency, e.g., between 10-20 times greater than the bus clock signal, asymmetric duty cycle control gives more margin to slave devices.

As such, master device 20 may dynamically adjust the low portion period of the bus clock signal in units or granularity of the system clock signal. In one particular example, approximately 4 nanoseconds of granularity may be provided for adjusting the duty cycle of the bus clock signal output from master device 20. In particular embodiments, this low portion period may be increased for larger form factor platforms and decreased for smaller form factor platforms. And similarly, the high portion period may be decreased for larger form factor platforms and increased for smaller form factor platforms. With this asymmetric duty cycle, more time is allowed for a falling edge to propagate to slave devices 40, thus providing more time for such devices to drive the data line prior to a next rising edge of the bus clock signal.

Due to read window bus available limitation times without an embodiment, many system platform topologies provide a specification limit as to a long reach platform solution. For example, a circuit board trace (FR4) may be limited to be 15-20 inches and a standard cable length limited to 0.3 meters (m)-0.5 meters depending on cable type by a given system specification. Many types of computing systems such as client, Internet of Things (IoT) and automotive applications may have longer board traces of more than 20 inches and also cable length longer than, e.g., 1 m to 5 m or more. Additionally, some proprietary slaves may have longer delays than specified in a given specification, which may also limit the slave device selection choice. Using an embodiment, a system designer is afforded the flexibility to use long reach solutions for board traces or cables (e.g., for automotive and IoT segments) without limiting the bus operating frequency.

Embodiments provide techniques to control a duty cycle of the bus clock signal communicated on bus 15. To this end, bus master 20 may receive configuration information including an adjustment value, e.g., during boot or otherwise. Based at least in part on this adjustment value, bus master 20 may control the bus clock signal communicated on bus 15 to have an asymmetric duty cycle. Understand that this controllable adjustment value may provide an ability for bus master 20 to provide a programmable asymmetric duty cycle, e.g. based on a given platform which the bus master is implemented.

Figure 2:
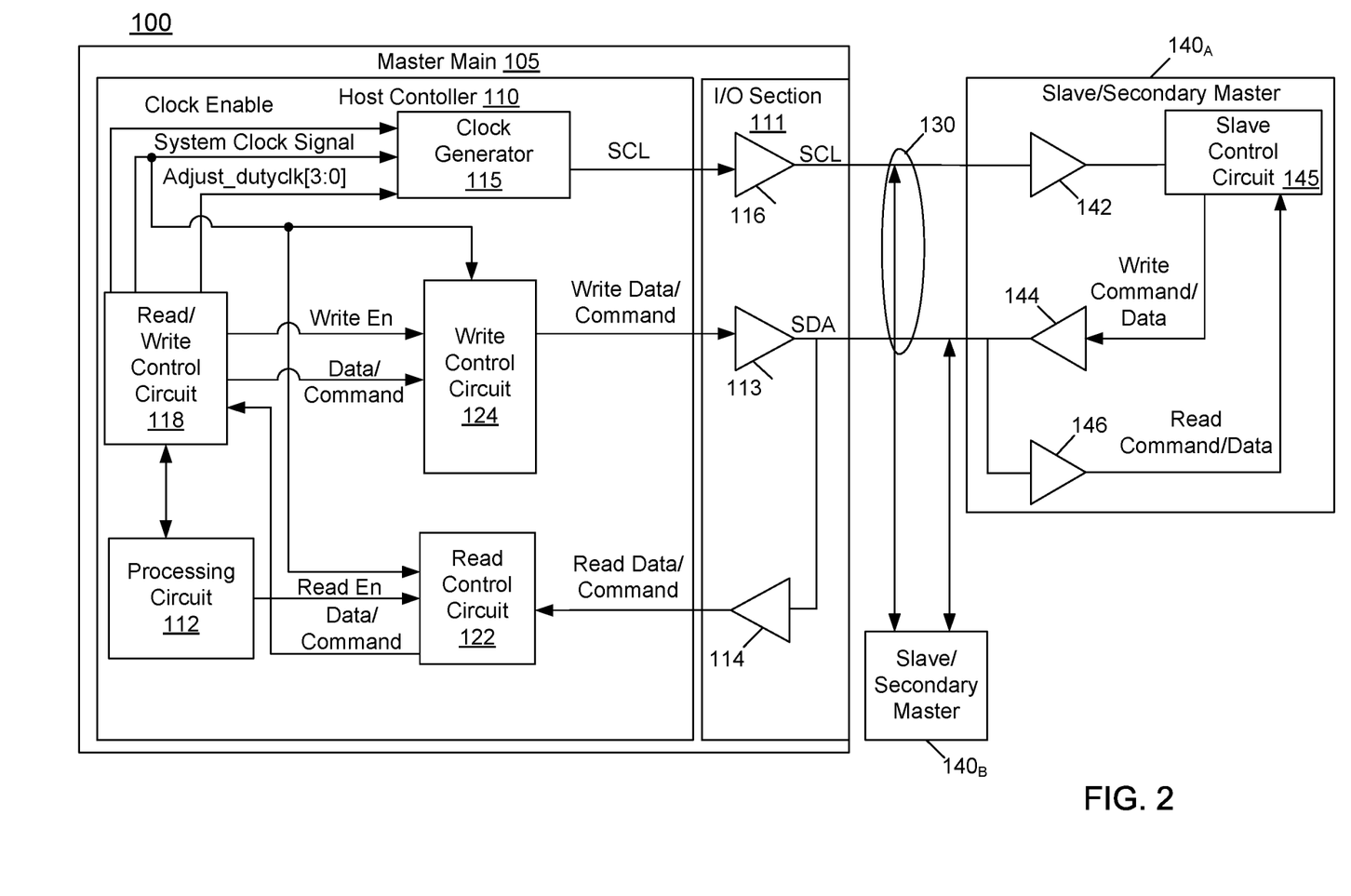
FIG. 2 is a block diagram of a system in accordance with another embodiment of the present invention.

Referring now to FIG. 2, shown is a block diagram of a system in accordance with an embodiment of the present invention. As shown in FIG. 2, a portion of a system 100 includes a main master 105 including a host controller 110 coupled to a plurality of devices $140_A$-$140_B$ via a multi-drop bus 130. As further illustrated, main master 105 includes an input/output (I/O) section 111. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a unidirectional manner.

At the high level illustrated in FIG. 2, assume that different types of devices 140 are present. Devices $140_{A-B}$ have, inter alia, different physical placements and electrical performance. Specifically, device $140_A$ may be always powered on and present as being coupled to bus 130. As an example, device $140_A$ may be a given type of sensor, such as an accelerometer or other sensor which may be incorporated in a given system (such as a smartphone or other mobile platform). For purposes of discussion herein, assume that device $140_A$ operates as a slave to host controller 110 (but may also be configured as a secondary bus master). As shown, device $140_A$ may include a corresponding clock receiver 142, receiver 146 and transmitter 144, all coupled to a slave control circuit 145. Of interest here, slave control circuit 145 may place new write data for communication on bus 130 during a low portion period of the received bus clock signal.

Device $140_E$ may be powered when it is to be active. As an example, assume that device $140_E$ is another type of sensor, such as a camera device. In such example, device $140_E$ may be powered on only when a camera functionality of the system is active. In other cases device $140_E$ may be a slave device that can be physically added/removed via a hot plug or hot unplug operation, such as a cable, card, or external peripheral device that is coupled to bus 130, e.g., by a cable, external connection or so forth. In still other cases, device $140_E$ may be coupled via an in-box cable. In such cases, there may be a long distance between device $140_B$ and host controller 110. Note that device $140_E$ may be relatively further away from host controller 110 than device $140_A$.

As illustrated in FIG. 2, host controller 110 includes a processing circuit 112. Understand that many different types of host controllers can be provided. As examples, host controller 110 may be an interface circuit of a multicore processor or other SoC, application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples, via a read/write control circuit 118 to a corresponding write control circuit 124 and a read control circuit 122, to a driver 113 that drives data onto bus 130. And read control circuit 122 is coupled to a receiver 114 that receives incoming data via a data line of bus 130.

As further shown, read/write control circuit 118 may provide control signals and data/command information to write control circuit 124 and read control circuit 122. Such control signals include write and read enable signals to write control circuit 124 and read control circuit 122 respectively. Still further, actual data and/or command information to be communicated via bus 130 (in a forward direction or reverse direction) also may be communicated via read/write control circuit 118 such that incoming data/command information may be provided from read control circuit 122 to read/write control circuit 118 (that in turn may provide such information to processing circuit 112). In addition, outgoing data/command information, e.g. originating in processing circuit 112 may be communicated via read/write control circuit 118 to write control circuit 124 for communication from host controller 110.

Host controller 110 further includes a clock generator 115 to provide a bus clock signal (and/or to receive a bus clock signal, in certain implementations) to a clock line of bus 130 via corresponding driver 116. In various embodiments, clock generator 115 may be configured to provide additional clock signals for use in host controller 110 (not shown in FIG. 2 for ease of illustration).

To perform programmable asymmetric duty cycle control of the bus clock signal, clock generator 115 receives an adjustment value (Adjust_dutyclk [3:0]) from read/write control circuit 118, which may store this value in a configuration register. Note that read/write control circuit 118 may receive this value for storage in the configuration register on boot of a system including main master 105. In addition, read/write control circuit 118 may further provide a system clock signal to clock generator 115. In different embodiments, the system clock signal may be generated internally to main master 105, or may be provided from an off-chip source such as another clock generator, crystal oscillator or so forth.

In any event, when enabled by a clock enable signal from read/write control circuit 118, clock generation circuit 115 may control the generation of the bus clock signal (SCL) to have an asymmetric duty cycle based at least in part on the adjustment value. While in embodiments herein this adjustment value may cause a low portion period of a full period of the clock signal to be larger than a high portion period of the full period, in other cases it is possible for the asymmetric duty cycle to be implemented having a larger high portion period than low portion period.

Note that the system clock signal may operate at a much faster rate than the SCL clock. Although the scope of the present invention is not limited in this regard, as examples the system clock signal may be between approximately 200-400 MHz, while the bus clock signal may operate at a rate of approximately 12.5 MHz.

Figure 3A:
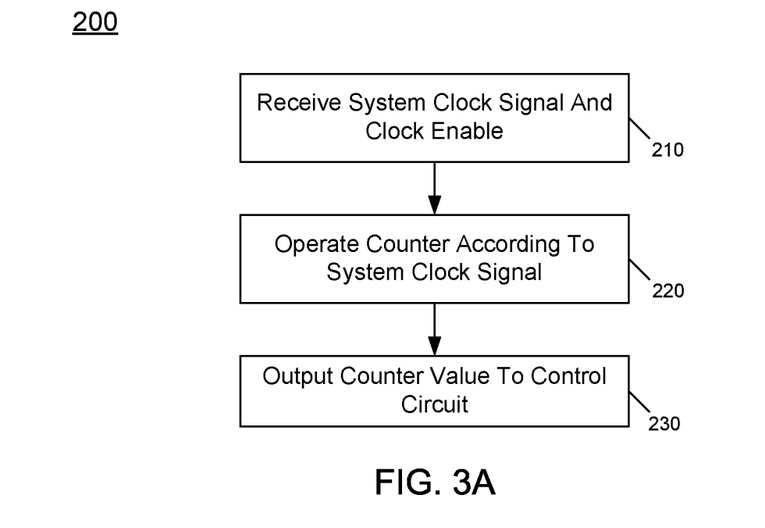
FIG. 3A is a flow diagram of a method in accordance with an embodiment of the present invention.

Referring now to FIG. 3A, shown is a flow diagram of a method in accordance with an embodiment of the present invention. As shown in FIG. 3A, method 200 may be performed by hardware, software, firmware and/or combinations thereof. In a particular embodiment, method 200 may be performed by a clock generation circuit of a bus master such as a host controller as described herein. As illustrated, method 200 is a method for providing control information from a first portion of a clock generation circuit to a second portion of the clock generation circuit. Method 200 begins by receiving a system clock signal and a clock enable (block 210). Note that this system clock signal may be received from an on-chip source or off-chip source, and the clock enable may indicate that normal operations are to occur.

At block 220 a counter may be operated according to the system clock signal. In an example embodiment, this counter may be implemented as 4-bit counter to maintain a counter value between 0 and 15. In embodiments, this counter may be an incrementing counter, although in other cases a decrementing counter may be used. Still with reference to FIG. 3A, during normal operation the counter value may be output to a control circuit (block 230). Note that this control circuit is another (e.g., second) portion of a clock generation circuit as described herein. As such, during normal operation the counter value, which may be updated according to the system clock signal, is provided in incrementing fashion to this control circuit (e.g. starting from a value of 0 and proceeding to a value of N−1). Understand while shown at this high level in the embodiment of FIG. 3A, many variations and alternatives are possible.

Figure 3B:
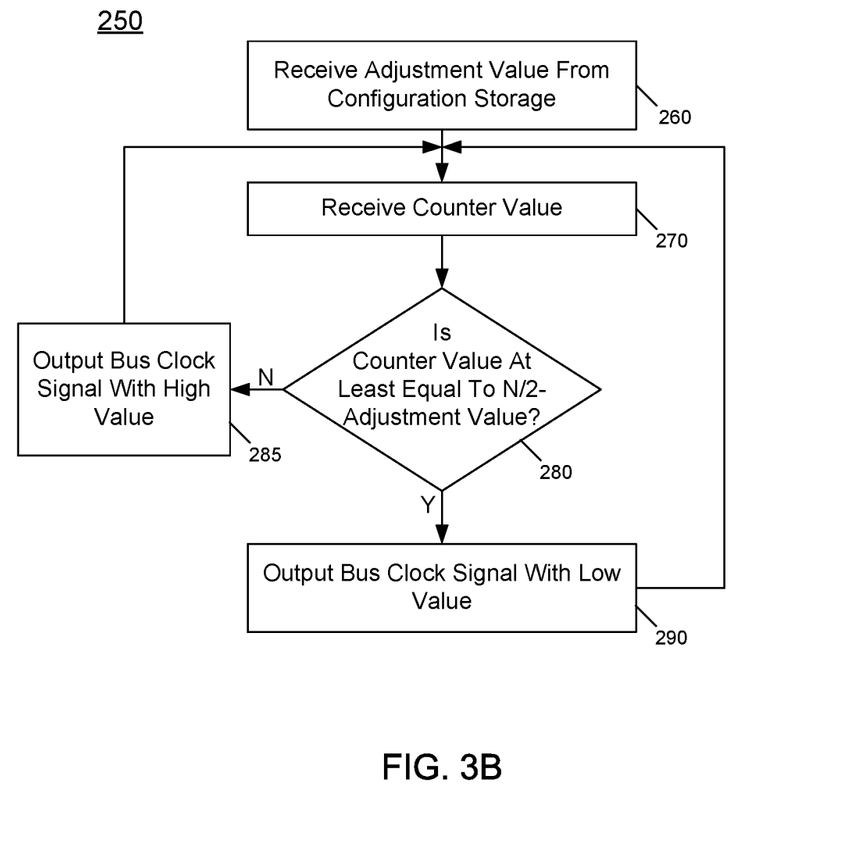
FIG. 3B is a flow diagram of a method in accordance with another embodiment of the present invention.

Referring now to FIG. 3B, shown is a flow diagram of a method in accordance with another embodiment of the present invention. As shown in FIG. 3B, method 250 may be performed by hardware, software, firmware and/or combinations thereof, such as a control circuit of the clock generation circuit. As illustrated, method 250 may begin by receiving an adjustment value from a configuration storage (block 260). Note that this adjustment value may, in an embodiment, be provided on system reset or other boot operation. In one embodiment, this adjustment value may be a four-bit value. Referring to FIG. 3B, control next passes to block 270 where the counter value is received. As an example, this counter value may be received at the frequency of the system clock signal from the first portion of the clock generation circuit (in accordance with method 200 of FIG. 3A).

Next it is determined at diamond 280 whether the counter value is at least equal to a threshold value (namely, a value of N/2 less the adjustment value). If not, control passes to block 285 where the bus clock signal may be output with a high value. As such, responsive to this determination of a counter value less than this threshold value, a high or logic 1 value of the bus clock signal is output via the clock line as part of the high portion period of the asymmetric duty cycle. Instead, if it is determined at diamond 280 that the counter value is at least equal to the threshold value, control passes to block 290 where the bus clock signal may be output with a low value. As such, responsive to this determination of the counter value at least equal to the threshold value, a low or logic 0 value of the bus clock signal is output via the clock line as part of the low portion period of the asymmetric duty cycle. Understand while shown at this high level in the embodiment of FIG. 3B, many variations and alternatives are possible.

Although the scope of the present invention is not limited in this regard, embodiments may provide system designer flexibility for multi-drop buses to cover long reach solution for IoT, automotive and client segments. As a result, embodiments need not reduce bus operating frequency for such systems, and can scale maximum operating frequency.

Figure 4:
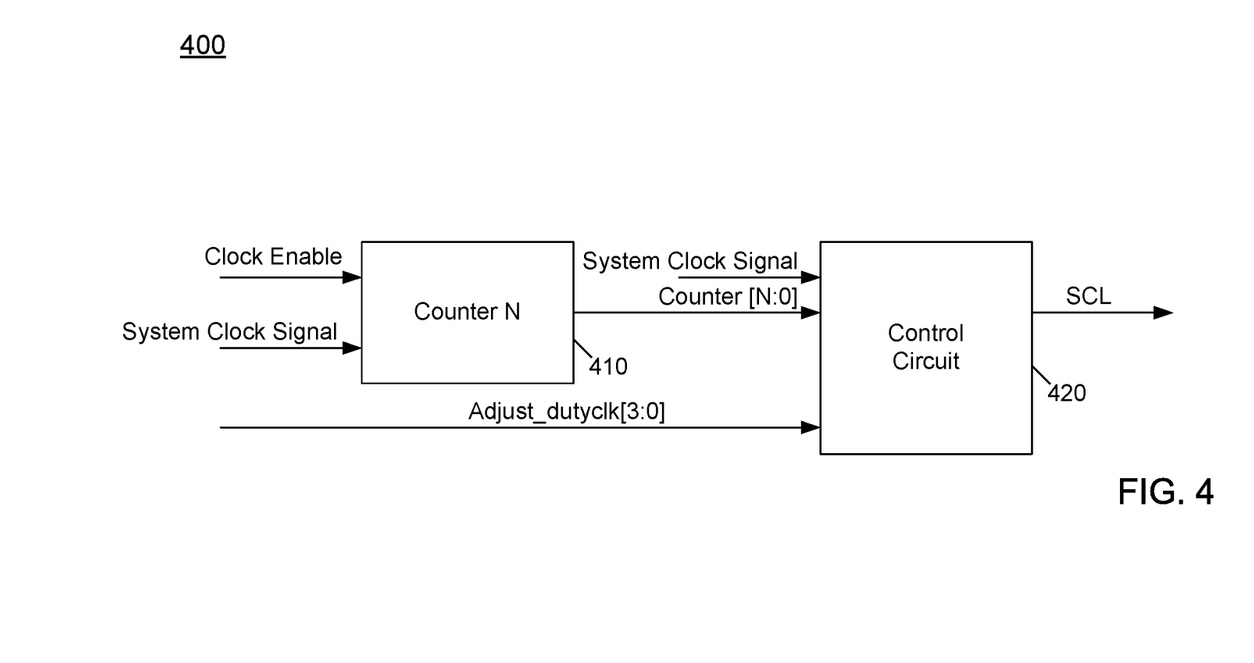
FIG. 4 is a block diagram of a clock generation circuit in accordance with an embodiment of the present invention.

Referring now to FIG. 4, shown is a block diagram of a clock generation circuit in accordance with an embodiment of the present invention. As shown in FIG. 4, clock generation circuit 400 may be implemented as a hardware circuit, although other implementations are possible. In the particular embodiment shown in FIG. 4, clock generation circuit 400 includes a counter 410, which may be implemented as an incrementing counter to count from a value of 0 to N−1. As illustrated, counter 410 is clocked by a system clock signal, when enabled by a clock enable signal. In turn, counter 410 provides a counter value output (Counter [N:0]) to a control circuit 420. In embodiments herein, control circuit 420 is further coupled to receive the system clock signal and an adjustment value (Adjust_dutyclk[3:0]).

In embodiments, control circuit 420 is configured to perform the techniques described, e.g., in FIG. 3B to receive the system clock signal and based on the counter value and the adjustment value, output the bus clock signal (SCL) having an asymmetric duty cycle. In embodiments, control circuit 420 may further include clock divider circuitry to generate the bus clock signal at a given bus clock frequency that is, e.g., a fractional integer of the system clock signal. While shown at this high level in the embodiment of FIG. 4, many variations and alternatives are possible.

Figure 5:
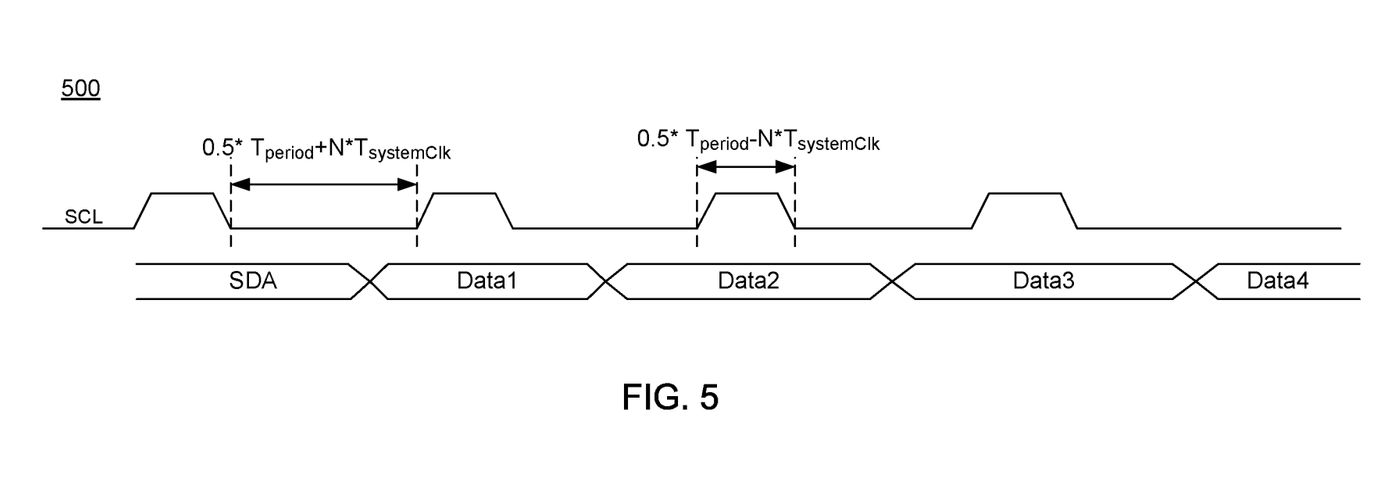
FIG. 5 is a timing diagram illustrating clock signal generation in accordance with an embodiment.

Referring now to FIG. 5, shown is a timing diagram illustrating clock signal generation in accordance with an embodiment. As shown in FIG. 5, a bus clock signal SCL is generated that has a given frequency. Note that the bus clock signal has an asymmetric duty cycle, such that its high portion period is of shorter duration than its low portion period. More specifically as illustrated, the high portion period may have a width of $(0.5*T_{period} - N*T_{sysclk})$ where $T_{period}$ is the period of the bus clock signal, N is the adjustment value, and $T_{sysclk}$ is the period of the system clock signal. In turn, the low portion period may have a width of $(0.5*T_{period} - N*T_{sysclk})$. Note that the value of N may be programmable, e.g., according to particular devices that are coupled within the platform via the bus (which may controllably change upon each reset of the system). For example, the value of N may be configured by basic input/output system (BIOS) or other system software. In yet other cases, this adjustment value may be configured via register programming.

Note that for a given platform, there may be a minimum allowed high portion period $(T_{high})$, thus constraining an increase in the low portion $(T_{low})$ to a particular configurable value (e.g., a relatively small number). Nevertheless, this configurable value may be sufficient to allow increase in trace lengths for various form factors, increasing read and write margins.

While for ease of implementation, the bus clock signal may be maintained with a fixed asymmetric duty cycle for all phases of operation, embodiments are not so limited. That is, in other cases the asymmetric duty cycle implementation of the bus clock signal may be dynamically controlled to be active only during bus master read operations from one or more particular slave devices. Instead for write operations from the bus master and/or read operations from other slave devices, the bus clock signal may be communicated with a symmetric duty cycle. Still further, while examples herein are with regard to control of the bus clock signal by the bus master, in some cases it is possible for one or more other devices to generate the bus clock signal (with a programmable asymmetric duty cycle), such as in the case of one or more secondary bus masters and/or one or more slave devices having advanced compute and internal clock generation capabilities.

Figure 6:
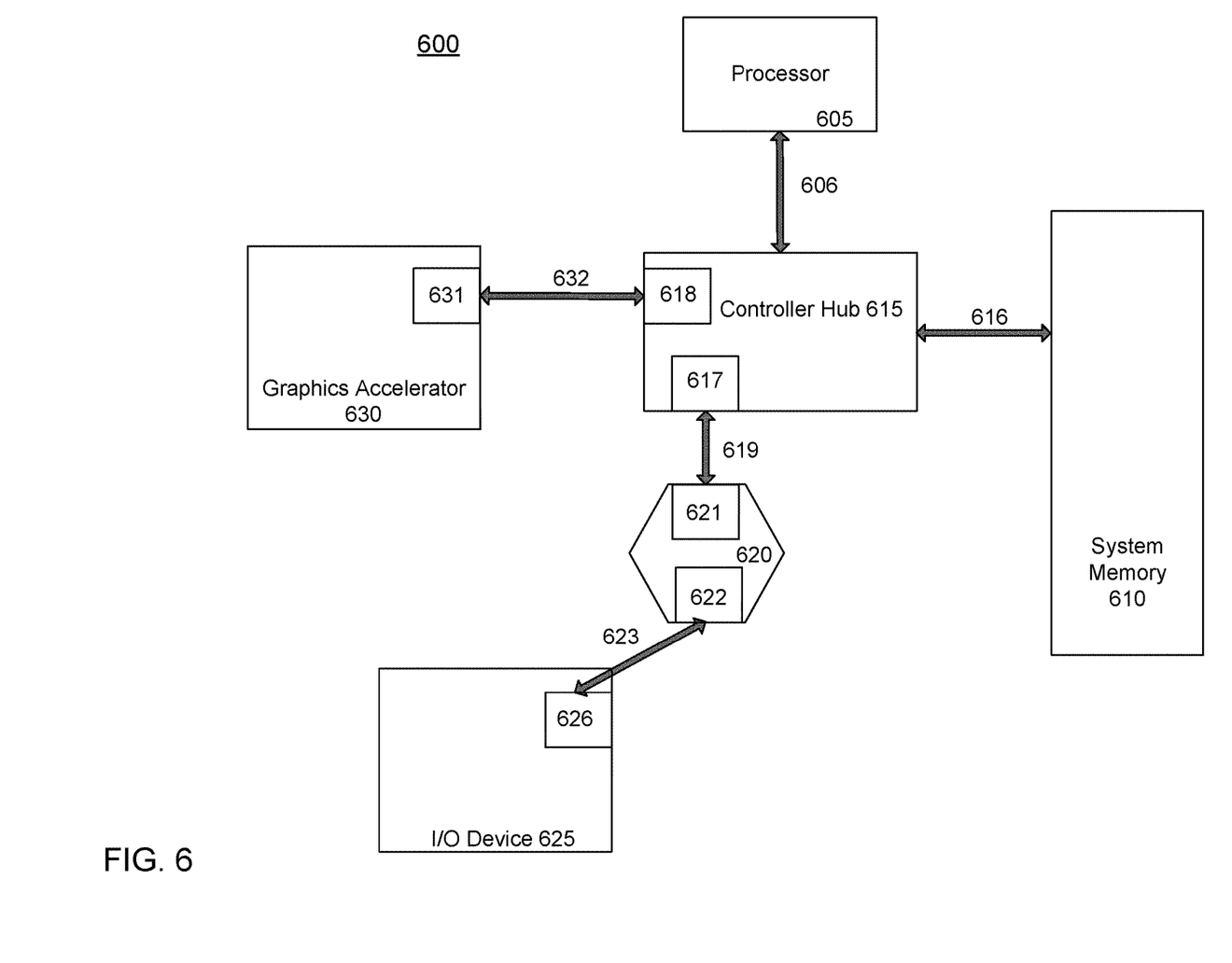
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more host controllers to perform asymmetric clock control as described herein.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an input/output controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
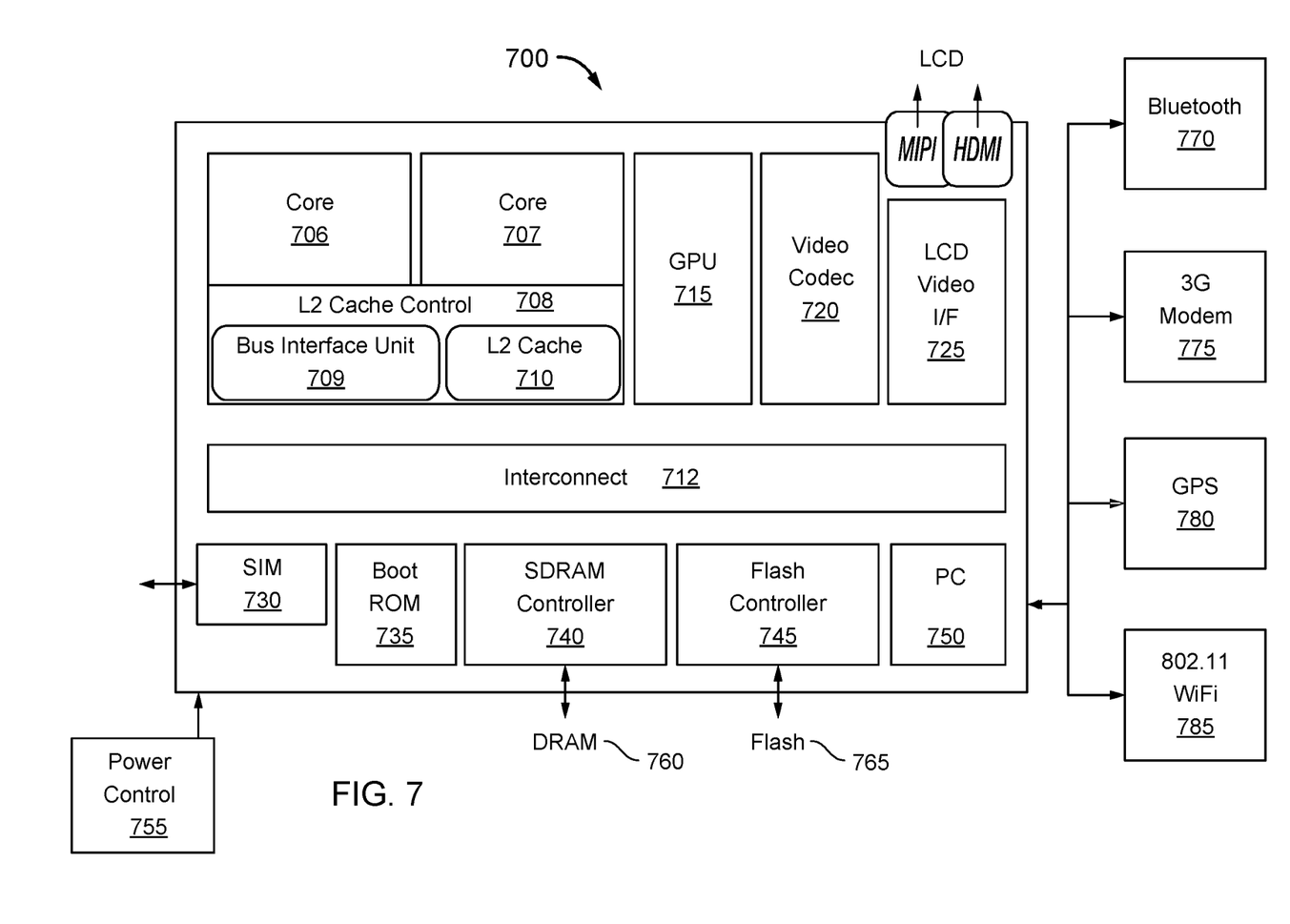
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including the asymmetric duty cycle clock control described herein. In addition, the system illustrates peripherals for communication, such as a Bluetooth module 770, 3G modem 775, GPS 780, and WiFi 785. Also included in the system is a power controller 755.

Figure 8:
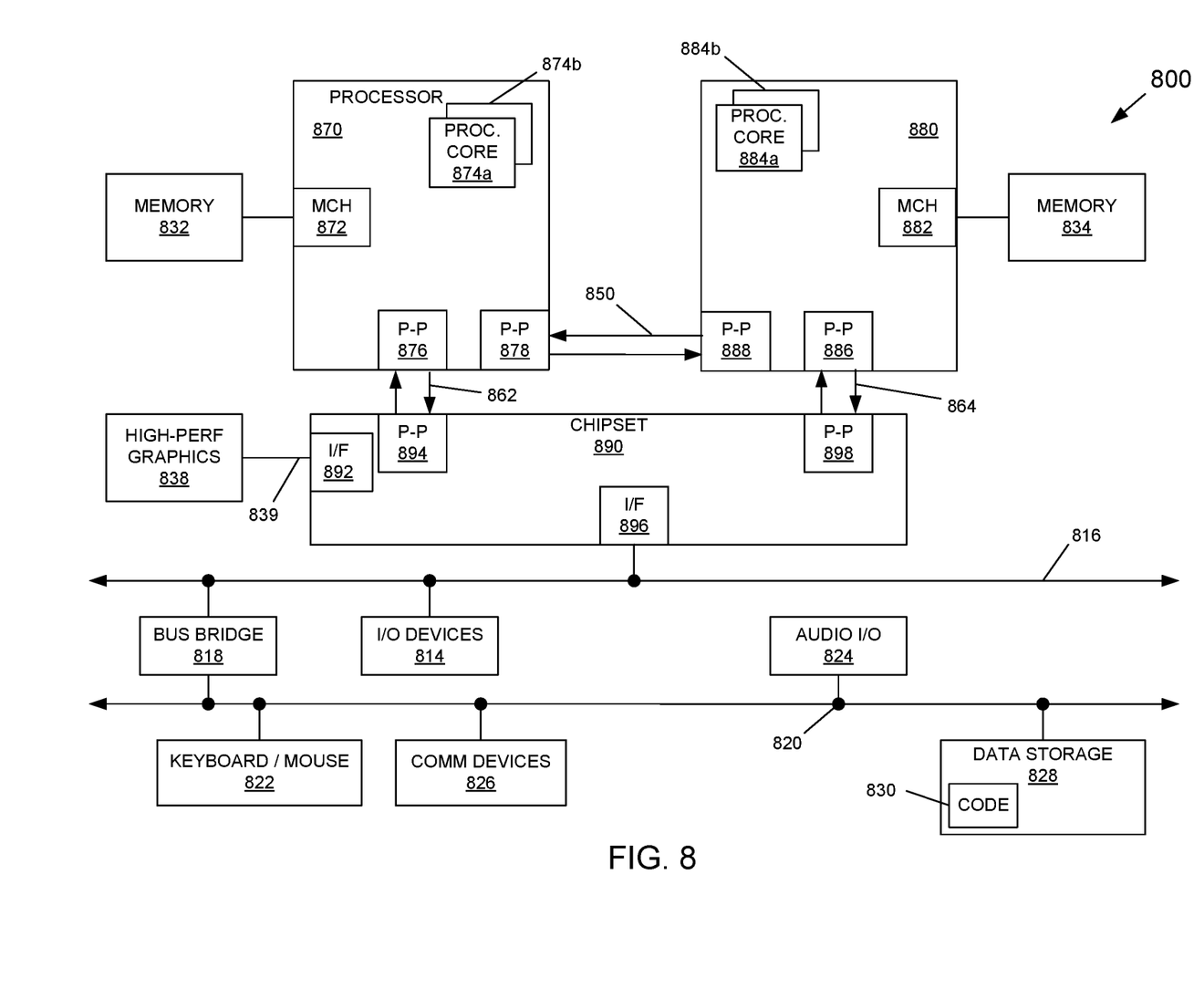
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 8 may be configured to perform bus master activities (including the asymmetric duty cycle clock control) for one or more of the interconnect structures, as described herein.

The following examples pertain to further embodiments.

In one example, an apparatus comprises a host controller to couple to an interconnect to which a plurality of devices may be coupled. The host controller may include: a first driver to drive first information onto the interconnect according to a bus clock signal; a first receiver to receive second information from at least one of the plurality of devices via the interconnect according to the bus clock signal; and a clock generation circuit to generate the bus clock signal having an asymmetric duty cycle.

In an example, the host controller comprises a configuration register to store an adjustment value, the clock generation circuit to generate the bus clock signal having the asymmetric duty cycle using the adjustment value.

In an example, the adjustment value is determined based at least in part on a topology of a platform including the plurality of devices and the host controller.

In an example, the clock generation circuit is to generate the bus clock signal having the asymmetric duty cycle formed of a plurality of periods, each of the plurality of periods having a low portion period and a high portion period, the low portion period longer than the high portion period.

In an example, the host controller further comprises a read controller coupled to the first receiver to read the second information during the high portion period of the bus clock signal.

In an example, the read controller is to sample the second information at a positive edge transition of the bus clock signal from the low portion period to the high portion period.

In an example, the clock generation circuit is to receive a system clock signal having a symmetric duty cycle and generate based thereon the bus clock signal having the asymmetric duty cycle.

In an example, the clock generation circuit comprises a counter to receive the system clock signal and maintain a counter value based on the system clock signal.

In an example, the clock generation circuit further comprises a control circuit to receive the adjustment value and the counter value and output the bus clock signal having the asymmetric duty cycle in response to the counter value and the adjustment value.

In an example, the counter is to count between 0 and N−1, and the adjustment value comprises a configurable value between 0 and N−1.

In an example, the adjustment value is to be set by firmware on reset of the apparatus.

In an example, the host controller comprises a master device to send the bus clock signal to the plurality of devices, the plurality of devices comprising a plurality of slave devices.

In an example, the first receiver is to receive the second information from a first slave device, the first slave device to send the second information during a low portion period of the bus clock signal received from the host controller.

In another example, a method comprises: receiving, in a control circuit of a clock generation circuit of a host controller that couples to one or more slave devices via a bus, an adjustment value; receiving, in the control circuit, a counter value according to a system clock signal; comparing, in the control circuit, the counter value to a threshold value, the threshold value based at least in part on a width of the counter and the adjustment value; and outputting a bus clock signal on the bus having an asymmetric duty cycle according to a result of the comparison of the counter value to the threshold value.

In an example, the method further comprises outputting the bus clock signal having the asymmetric duty cycle in which a low portion period is greater than a high portion period.

In an example, the method further comprises receiving first information in the host controller from a first slave device coupled to the bus and sampling the first information on a rising edge of the bus clock signal, the first slave device to change data of the first information during the low portion period of the bus clock signal.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a host controller to generate a bus clock signal having an asymmetric duty cycle for communication on a bus, the host controller having a read controller to read data communicated from a first device coupled to the host controller via the bus at a rising edge of the bus clock signal; the first device coupled to the host controller via the bus, where the first device is to provide the data to the bus during a low portion period of the bus clock signal; and a second device coupled to the host controller via the bus.

In an example, the host controller comprises a configuration register to store an adjustment value, the host controller to generate the bus clock signal having the asymmetric duty cycle using the adjustment value.

In an example, the host controller is to receive a system clock signal having a symmetric duty cycle and generate based thereon the bus clock signal.

In an example, the host controller comprises a counter to receive the system clock signal and maintain a counter value based on the system clock signal, the host controller to output the bus clock signal having a high value when the counter value is less than a threshold value and output the bus clock signal having a low value when the counter value is at least equal to the threshold value, the threshold value based at least in part on the adjustment value.

In yet an example, an apparatus comprises: clock generation means for generating a bus clock signal having an asymmetric duty cycle; clock driver means for driving the bus clock signal having the asymmetric duty cycle on a bus that couples the apparatus to a plurality of devices; data driver means for driving first information onto the bus according to the bus clock signal having the asymmetric duty cycle; and receiver means for receiving second information from at least one of the plurality of devices via the bus according to the bus clock signal having the asymmetric duty cycle.

In an example, the apparatus further comprises a configuration storage means for storing an adjustment value, the clock generation means for generating the bus clock signal having the asymmetric duty cycle using the adjustment value.

In an example, the clock generation means is to receive a system clock signal having a symmetric duty cycle and generate based thereon the bus clock signal having the asymmetric duty cycle.

In an example, the clock generation means comprises a counter means for receiving the system clock signal and maintaining a counter value based on the system clock signal.

In an example, the clock generation means further comprises control means for receiving the adjustment value and the counter value and outputting the bus clock signal having the asymmetric duty cycle in response to the counter value and the adjustment value.

In an example, the clock generation means is to generate the bus clock signal having the asymmetric duty cycle formed of a plurality of periods, each of the plurality of periods having a low portion period and a high portion period, the low portion period longer than the high portion period. In an example, the apparatus further comprises read control means for reading the second information during the high portion period of the bus clock signal having the asymmetric duty cycle.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a host controller to couple to an interconnect to which a plurality of devices may be coupled, the host controller including:
a first driver to drive first information onto the interconnect according to a bus clock signal;
a first receiver to receive second information from at least one of the plurality of devices via the interconnect according to the bus clock signal; and
a clock generation circuit to generate the bus clock signal having an asymmetric duty cycle.

2. The apparatus of claim 1, wherein the host controller comprises a configuration register to store an adjustment value, the clock generation circuit to generate the bus clock signal having the asymmetric duty cycle using the adjustment value.

3. The apparatus of claim 2, wherein the adjustment value is determined based at least in part on a topology of a platform including the plurality of devices and the host controller.

4. The apparatus of claim 2, wherein the clock generation circuit is to generate the bus clock signal having the asymmetric duty cycle formed of a plurality of periods, each of the plurality of periods having a low portion period and a high portion period, the low portion period longer than the high portion period.

5. The apparatus of claim 4, wherein the host controller further comprises a read controller coupled to the first receiver to read the second information during the high portion period of the bus clock signal.

6. The apparatus of claim 5, wherein the read controller is to sample the second information at a positive edge transition of the bus clock signal from the low portion period to the high portion period.

7. The apparatus of claim 2, wherein the clock generation circuit is to receive a system clock signal having a symmetric duty cycle and generate based thereon the bus clock signal having the asymmetric duty cycle.

8. The apparatus of claim 7, wherein the clock generation circuit comprises a counter to receive the system clock signal and maintain a counter value based on the system clock signal.

9. The apparatus of claim 8, wherein the clock generation circuit further comprises a control circuit to receive the adjustment value and the counter value and output the bus clock signal having the asymmetric duty cycle in response to the counter value and the adjustment value.

10. The apparatus of claim 8, wherein the counter is to count between 0 and N−1, and the adjustment value comprises a configurable value between 0 and N−1.

11. The apparatus of claim 2, wherein the adjustment value is to be set by firmware on reset of the apparatus.

12. The apparatus of claim 1, wherein the host controller comprises a master device to send the bus clock signal to the plurality of devices, the plurality of devices comprising a plurality of slave devices.

13. The apparatus of claim 12, wherein the first receiver is to receive the second information from a first slave device, the first slave device to send the second information during a low portion period of the bus clock signal received from the host controller.

14. At least one non-transitory computer readable storage medium comprising instructions that when executed enable a system to:
receive, in a control circuit of a host controller that couples to one or more slave devices via a bus, an adjustment value;
receive, in the control circuit, a counter value according to a system clock signal;
compare, in the control circuit, the counter value to a threshold value, the threshold value based at least in part on a width of the counter and the adjustment value; and
output a bus clock signal on the bus having an asymmetric duty cycle according to a result of the comparison of the counter value to the threshold value.

15. The at least one non-transitory computer readable medium of claim 14, further comprising instructions that when executed enable the system to output the bus clock signal having the asymmetric duty cycle in which a low portion period is greater than a high portion period.

16. The at least one non-transitory computer readable medium of claim 15, further comprising instructions that when executed enable the system to receive first information in the host controller from a first slave device coupled to the bus and sample the first information on a rising edge of the bus clock signal, the first slave device to change data of the first information during the low portion period of the bus clock signal.

17. A system comprising:
a host controller to generate a bus clock signal having an asymmetric duty cycle for communication on a bus, the host controller having a read controller to read data communicated from a first device coupled to the host controller via the bus at a rising edge of the bus clock signal;

the first device coupled to the host controller via the bus, wherein the first device is to provide the data to the bus during a low portion period of the bus clock signal; and a second device coupled to the host controller via the bus.

18. The system of claim 17, wherein the host controller comprises a configuration register to store an adjustment value, the host controller to generate the bus clock signal having the asymmetric duty cycle using the adjustment value.

19. The system of claim 18, wherein the host controller is to receive a system clock signal having a symmetric duty cycle and generate based thereon the bus clock signal.

20. The system of claim 19, wherein the host controller comprises a counter to receive the system clock signal and maintain a counter value based on the system clock signal, the host controller to output the bus clock signal having a high value when the counter value is less than a threshold value and output the bus clock signal having a low value when the counter value is at least equal to the threshold value, the threshold value based at least in part on the adjustment value.

\* \* \* \* \*